United States Patent [19]

Vick

[11] Patent Number: 5,180,243
[45] Date of Patent: Jan. 19, 1993

[54] APPARATUS FOR CLEANING SENSITIVE SURFACES, IN PARTICULAR OPTICAL GLASSES

[76] Inventor: Walter Vick, Hermann Löns Str. 15, D-2902 Rastede, Fed. Rep. of Germany

[21] Appl. No.: 334,104
[22] PCT Filed: Jun. 14, 1988
[86] PCT No.: PCT/EP88/00524
§ 371 Date: Feb. 17, 1989
§ 102(e) Date: Feb. 17, 1989
[87] PCT Pub. No.: WO88/10443
PCT Pub. Date: Dec. 29, 1988

[30] Foreign Application Priority Data
Jun. 20, 1987 [DE] Fed. Rep. of Germany ....... 3720502

[51] Int. Cl.⁵ .............................................. G02C 13/00
[52] U.S. Cl. .................................... 401/195; 15/214; 15/118; 401/23; 401/37; 401/207
[58] Field of Search .................. 15/214, 114, 118; 401/37, 23, 195, 207; 206/233

[56] References Cited

U.S. PATENT DOCUMENTS

| | | | |
|---|---|---|---|
| 2,277,710 | 1/1941 | Finn | 401/37 X |
| 2,411,310 | 11/1946 | Wilkins | 15/214 X |
| 2,787,501 | 4/1957 | Tuma | |
| 2,789,725 | 4/1957 | Carper | 206/233 X |
| 2,908,923 | 10/1959 | Schlechter | 15/118 X |
| 3,254,360 | 6/1966 | Hageman | |

FOREIGN PATENT DOCUMENTS

| | | | |
|---|---|---|---|
| 225776 | 6/1987 | European Pat. Off. | |
| 7106192 | 5/1971 | Fed. Rep. of Germany | |
| 2814902 | 10/1979 | Fed. Rep. of Germany | 15/214 |
| 8234202 | 5/1983 | Fed. Rep. of Germany | |
| 192337 | 2/1938 | Switzerland | 15/114 |
| 359799 | 10/1931 | United Kingdom | 401/23 |
| 2124404 | 2/1984 | United Kingdom | |

Primary Examiner—Steven A. Bratlie
Attorney, Agent, or Firm—Collard & Roe

[57] ABSTRACT

An apparatus for cleaning sensitive surfaces, in particular optical glasses or the like, having a receiving device for accommodating a wetting and wiping device for the surfaces to loosen and detach impurities. The apparatus also has a cleaning device for absorptively removing the impurities from the surface. The wetting and wiping device has a liquid-dispensing wiping head and a liquid dispenser.

31 Claims, 3 Drawing Sheets

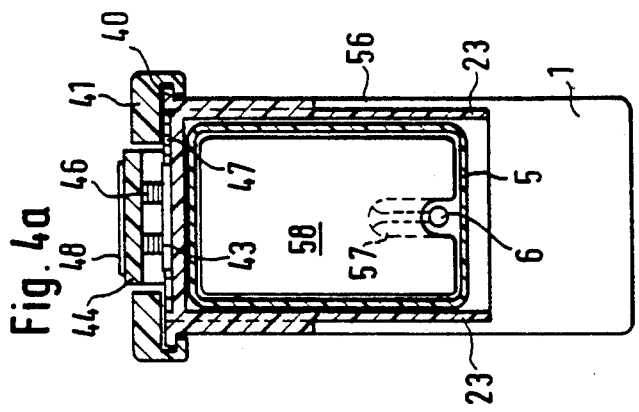
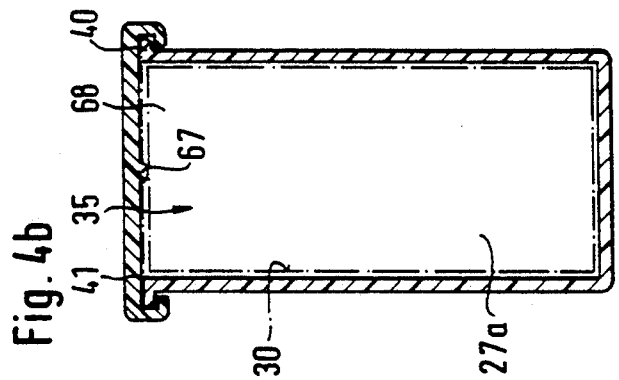
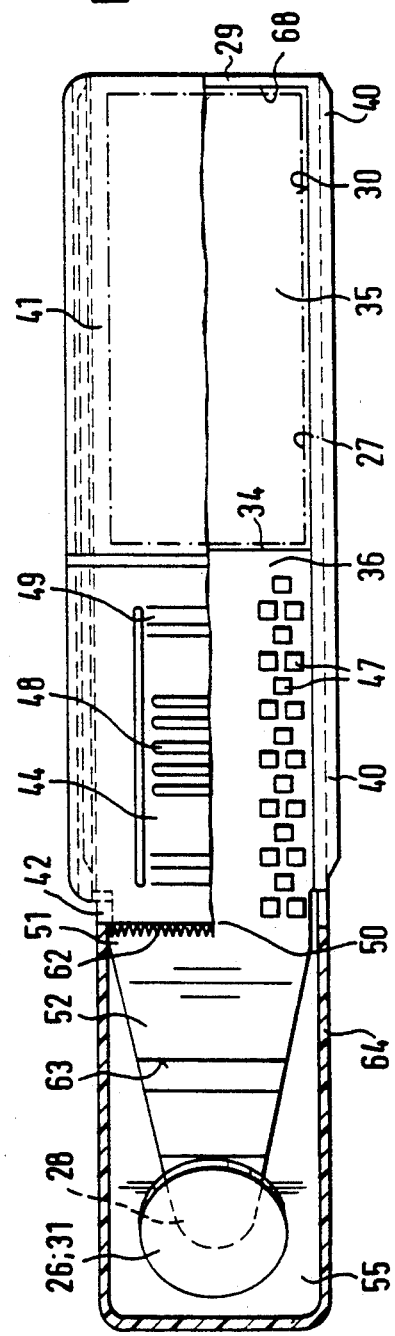
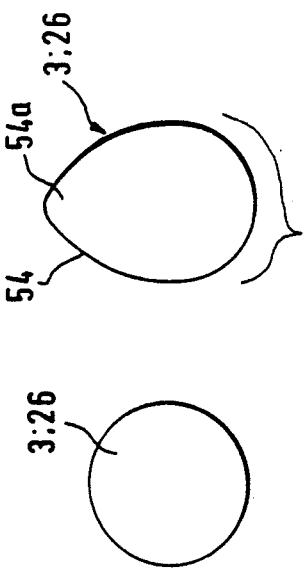

5,180,243

APPARATUS FOR CLEANING SENSITIVE SURFACES, IN PARTICULAR OPTICAL GLASSES

BACKGROUND OF THE INVENTION

1. Field of the Invention

The present invention relates to an apparatus for cleaning sensitive surfaces which wets, wipes and cleans optical glasses.

2. The Prior Art

Various cleaning agents are used for optical glasses, in particular for lenses of spectacles. These known agents, however, have several drawbacks. This is particularly true when such lenses have to be cleaned while the wearer is travelling, at work, or while pursuing some leisure time activity. It has been found that the most useful method for cleaning glasses utilizes a cleaning liquid for loosening or detaching the impurities on the lenses, and subsequently wiping off such impurities with a cleaning cloth. These components are generally offered in the form of a spray bottle for the liquid and a cleaning cloth, which are stored in a pouch-like case.

These so-called cleaning sets for glasses can be comfortably carried in bags or suitcases; however, their efficiency is limited when they are used in the known manner. Such drawbacks include, on the one hand, applying the cleaning liquid to the lenses only because a relatively large portion of the liquid is lost as it is being sprayed on. The liquid deposits in all sorts of places, for example, on garments or table tops. This can be practically avoided only if the cleaning liquid is first applied to the cleaning cloth, or to an additional cloth for the wet treatment, with which the impurities are then to be loosened and detached. This, on the other hand, cannot properly work particularly if the surfaces to be cleaned are contaminated by impurities that are difficult to remove, for example, fingerprints, skin perspiration, smoke deposits, or even cosmetics. Tests have shown that the impurities are in fact loosened, but only gradually so, and the cleaning liquid is immediately absorbed into the cleaning cloth. These impurities as a result are additionally smeared over the surface. Consequently, the surfaces have to be cleaned again mechanically under the influence of a residual amount of moisture in the cleaning cloth.

Another drawback of conventional cleaning cloths is that the cleaning process has to be carried out with the help of the finger tips. The surfaces of the lenses cannot be reached directly up to the frame of the glasses. Contrary to the desired result, dirt is smeared into these zones. Also, the cleaning cloth itself is contaminated by the fingers, so that the cloth can no longer function properly after a few cleaning operations.

SUMMARY OF THE INVENTION

It is an object of the present invention to provide an apparatus by which known components can be used in such a way that the above drawbacks are avoided.

It is a further object of the present invention to provide such an apparatus which can be carried in bags or the like.

These and other related objects are achieved according to the invention by an apparatus for cleaning sensitive surfaces, in particular optical glasses or the like, having a receiving device. The receiving device accommodates a wetting and wiping device for the surfaces for loosening and attaching the impurities and a cleaning device for absorptively removing the impurities from the surfaces. The wetting and wiping device includes a liquid dispensing wiping head and a liquid dispenser. The liquid dispenser is a compressible bottle having a refilling closure on one side and a receiving space for accommodating the wiping head on the other side. The liquid dispenser has tapered dimensions toward the end having the receiving space in such a way that the wiping head laterally protrudes from the dispenser.

The wiping head has a substantially plate-shaped supporting part provided on one side with a fastening pin having a liquid duct. The other side of the wiping head has a preferably radially-extending distribution grooves between an axially-extending edge. The distribution grooves are covered by a wiping cloth which can be impregnated with liquid so that the edge of the wiping head in the radial direction is covered. The wiping cloth is a soft, brush-like material, for example, velvet.

The wiping cloth is placed around the wiping head in such a way that it is fixed on the back side of the wiping head by a holding device. The holding device is a plate adapted to the shape of the supporting part. The plate has an upwardly, conically expanded hole for receiving the fastening pin. The pin has a locking groove which engages with an inner locking edge of the holding device. The holding device has barbs on its outer edge, pointing in the axial direction. These barbs engage the wiping cloth. The holding device is shaped in such a way that in the mounted condition it rests with its outer edge pretensioned on the back side of the supporting part.

An elastic plate made of spongy material is inserted between the distribution grooves and the wiping cloth of the wiping head. The supporting part of the wiping head consists of a plastic material having a significantly softer consistency than the material of the holding device.

The fastening pin has a slightly conical shape at its end. The fastening pin is pressed into the correspondingly-shaped receiving space for accommodating the liquid dispenser.

The receiving device is formed as a handle having a compartment for receiving the liquid dispenser. The compartment is open on one side. Locking means within springy legs form the receiving compartment. These locking means are engaged by counter-locking means on the liquid dispenser.

The cleaning device includes a wiping plate and a supply of absorptive cloth. The cloth is advanceable for replacement and, in the operating condition, is partly localized between the wiping plate and the surface to be cleaned. The wiping plate is fastened on one free end of the receiving device and the supply of absorptive cloth is arranged on the opposite end in a compartment.

The wiping plate includes an elastic plastic material and has a substantially concave surface which is provided with a large number of small anchoring elevations. The wiping plate also has an elastic pin, engaging and locking a bore of the receiving device for receiving the pin. The wiping head and the wiping plate are secured on the parts supporting the liquid dispenser and the free end of the receiving device in such a way that their faces point in opposite directions. The wiping head and wiping plate are oriented so that their incline in the direction of the free end of the receiving device. The wiping head and wiping plate are in a symmetric position relative to each other, along an imaginary line extending in the longitudinal direction.

The compartment for receiving the absorptive cloth adjoins the receiving cavity behind a separating wall. The compartment has an opening substantially pointing in the opposite direction so that the strip-like absorptive cloth is guided in the direction of the wiping plate by way of a base wall of the receiving cavity. The supply of absorptive cloth is a roll of cloth. The absorptive cloth consists of several layers. The first layer of the absorptive cloth is made of an optical paper and is disposed opposite the surface to be cleaned. The second and third layers have increased absorptive capacities, with the third layer being stronger than the second layer.

The compartment is covered by a sliding cover running on guide bridges of the receiving device. The sliding cover has an extension pointing in the direction to the wiping plate. The cover and the base wall of the receiving space forms a guide gap for the absorptive cloth.

An outwardly convex springy zone is shaped in the extension of the sliding cover. The zone has transporting teeth for the absorptive cloth on its inner side. These teeth correspond with retaining teeth shaped on the base wall. On the outer side of the springy zone there are provided gripping ribs. The springy zone extends in lengthwise direction of the sliding cover. The zone is cut free on the sides with its two ends being connected with the sliding cover by compressible bending zones.

A tearing edge is formed by molded teeth on the face of the sliding cover and point in the direction of the free end of the receiving device. A raised guide slope in the zone at the base wall of the receiving space is located between the tearing edge and the wiping plate. The wiping head and the wiping plate have a round shape. The shape of the wiping head and the wiping plate is round in a part zone and in the remaining zone forms a rounded and extended point via convex curves. A hood covers both the wiping head and the wiping plate, as well as the receiving space with the liquid dispenser. The strip-like absorptive cloth is wider than the diameter of the wiping plate.

The apparatus according to the invention makes available a cleaning device, for example, for spectacles that can be carried. The impurities can be easily removed from the surfaces by a constant supply of cleaning liquid and a simultaneous wiping motion. Even spots directly bordering on the frame of the glasses—which are not readily accessible—can be reached for cleaning. The impurities virtually rise or float up in the cleaning liquid, or they are completely dissolved therein because the wiping head leaves an adequate amount of liquid on the surfaces for such purpose. The supply of absorptive cloth available in the device, which can be advanced without directly using the fingers, assures that clean cleaning cloth is always available; after it has been used, this cloth has to be torn off piece by piece.

Furthermore, the apparatus according to the invention offers the advantage that both components are available in one single handling means, and that by only rotating such means around its longitudinal axis, either the wetting and wiping device, or the cleaning device can be set to face the surface to be cleaned, whereby the latter is placed on the surface in a way such that the absorptive cloth is disposed between the wiping plate associated therewith, and the surface and thus displaceable in all directions.

BRIEF DESCRIPTION OF THE DRAWINGS

Additional benefits of the apparatus of the invention follow from the description and the drawings, in which:

FIG. 1A shows a detail;

FIG. 3 is a top view of the complete apparatus partly showing a sectional view;

FIG. 4A is a cross-sectional view taken along the line 4A—4A of FIG. 1;

FIG. 4B is a cross-sectional view taken along the line 4B—4B of FIG. 1;

FIGS. 5, 6 and 7 each show a detail.

DETAILED DESCRIPTION OF THE PREFERRED EMBODIMENT

Figure 1:
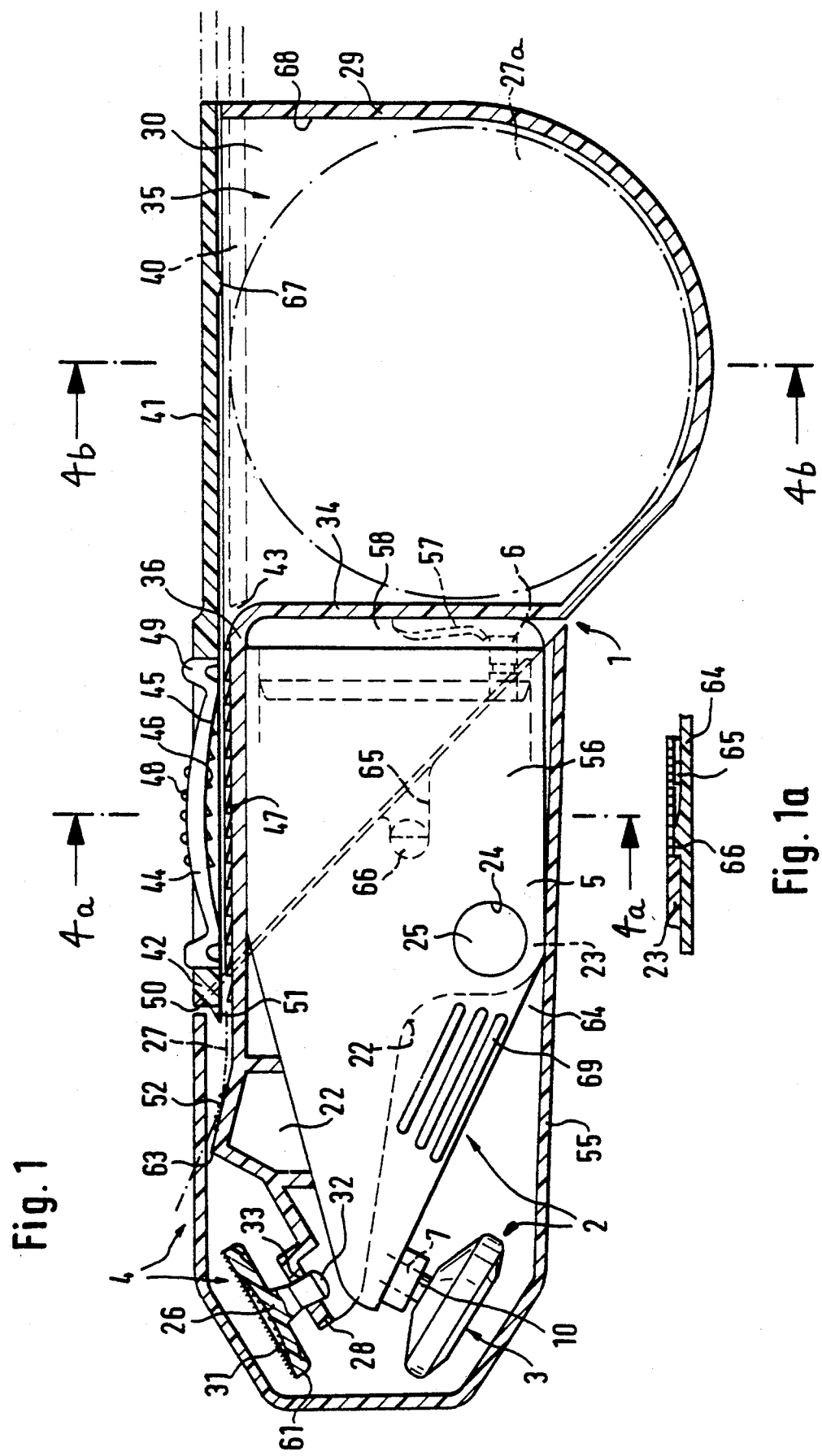
FIG. 1 is a lateral sectional view of the complete apparatus according to the invention.

FIG. 1 shows that the apparatus for cleaning sensitive surfaces, in particular lenses of spectacles, consists of a handle serving as a device 1 for accommodating a wetting and wiping device 2 and a cleaning device 4. The receiving part 1 is basically designed as an elongated part, which, based on FIG. 1, forms a receiving cavity 22 in its left zone, such cavity forming a U-shaped profile, which is open at the bottom. The receiving cavity 22 thus basically consists of a base wall 36, a separating wall 34, and two free legs 23, which are, therefore, springy.

In the elastic legs 23 of the receiving cavity 22, provision is made for the locking means 24 in the form of round openings, in which the correspondingly shaped counterlocking means 25 can engage, the latter being molded projecting from the side walls 56 of a liquid dispenser 5 designed in the form of a compressible bottle.

At its right end, liquid dispenser 5, which is a component of the wetting and wiping device 2, has a refill closure 6 which, via a sheet hinge 57, is homogeneously molded on a cover part 58. At its left end, dispenser 5 has an element 7 for receiving a fastening pin 10 of a wiping head 3, such element pointing downward with an inclination and having the form of a conical passage hole.

Figure 2:
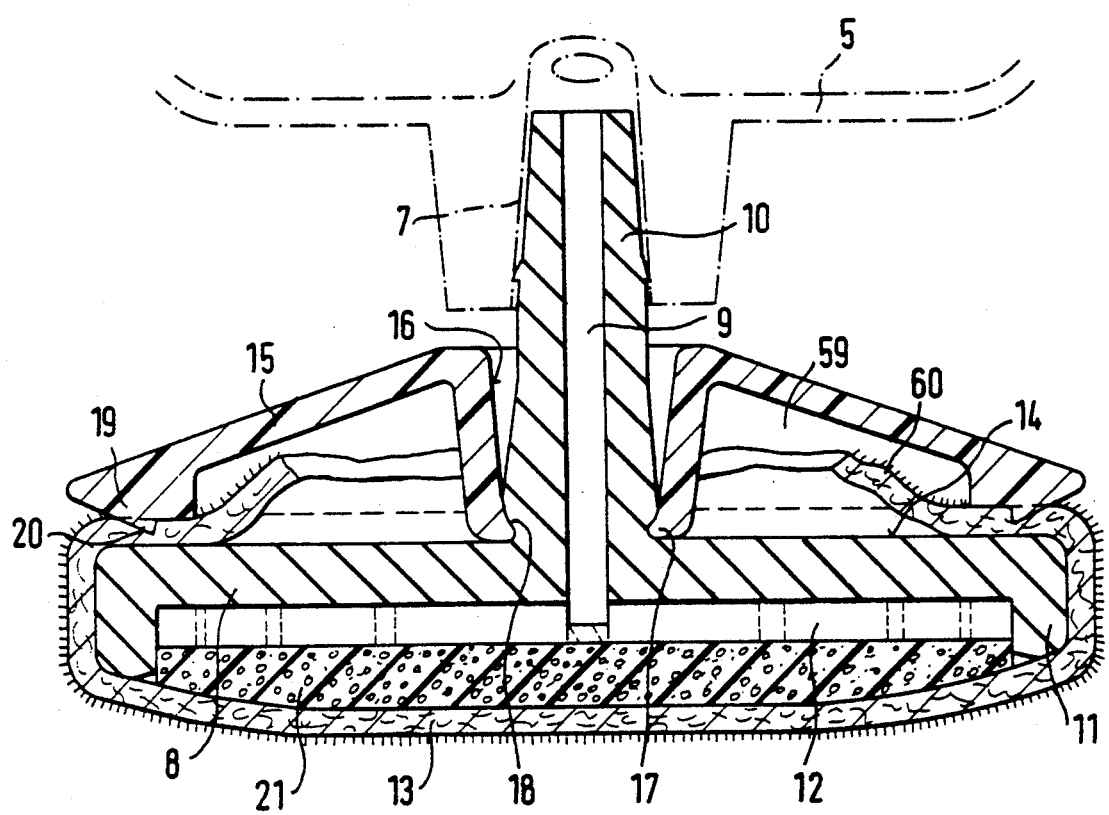
FIG. 2 is an enlarged sectional view through the wiping head.

Wiping head 3 consists of a substantially plate-shaped supporting part 8 (cf. in particular FIG. 2), such part having the conical fastening pins 10 molded on its one side, such pins having a duct 9 for the liquid extending therethrough, and an axially extending edge 11 molded on its other side, with provision made for the distribution grooves 12 for the cleaning liquid. Grooves 12 preferably radiating outwardly starting from duct 9 for the liquid. An elastic board 21 may be inserted between edge 11 and grooves 12. Edge 11 protrudes in the axial direction beyond distribution grooves 12. This elastic board 21 consists of a compressible spongy material that is permeable to liquid.

Wiping head 3 is covered by a soakable wiping cloth 13 consisting of a soft, brush-like material, for example, a velvet material, in a way such that at least its radial edge 11 is covered as well. For this purpose, wiping cloth 13, in the embodiment shown, is placed around supporting part 8 in such a way that it can be secured on its back side 14 by means of a holding device 15.

Holding device 15 is comprised of a plate having a form matching supporting part 8, and a hole 16 for receiving fastening pin 10, such hole being conically widened upwardly. Holding device 15, which is made from a plastic material with significantly harder consistency as compared to supporting part 8, has a locking edge 17 disposed in receiving hole 16. Edge 17 is capable of engaging and locking in a locking groove 18 of fastening pin 10 in such a way that in the mounted condition, outer edge 19 of holding device 15 points in the axial direction and rests pretensioned on back side 14 of supporting part 8. The barbs 20 pointing in the axial direction, which are molded onto outer edge 19, engage wiping cloth 13 to lock it in the mounted position.

The edges 60 of wiping cloth 13 are pressed together in a hollow space 59 of the holding device 15.

Fastening pin 10 of supporting part 8 is mounted in the receiving space 7 of liquid dispenser 5 by means of force fit. To make such fit safer, it is, of course, possible to make provision for locking grooves (not shown) on fastening pin 10 and/or in receiving element 7.

Toward its end supporting receiving space 7 for wiping head 3, liquid dispenser 5 is tapered in such a way that it is laterally protruded by wiping head 3.

Cleaning device 4 consists on the one hand of a wiping plate 26, which is secured on the one free end 28 of receiving device 1, and, on the other hand, absorptive cloth 27, which can be pulled off roll 27A forming the cloth supply. Wiping plate 26 consists of an elastic plastic material and has a substantially concave surface fitted with a great number of small, cone-shaped anchoring elevations 31. This surface serves for pressing the absorptive cloth 27 against the surface to be cleaned, for which purpose the absorptive cloth 27, in its working condition, is locked or enclosed between the wiping plate 26 and the surface to be cleaned. The absorptive cloth 27 is wider than the wiping head, so that it can lift itself up laterally on the outer edge 61 of the wiping plate 26.

For movably fastening wiping plate 26, an elastic locking pin 32 is provided for engaging a receiving bore 33 of free end 28 of receiving device 1. Free end 28 is significantly less wide than wiping plate 26 (see in particular FIG. 3).

Wiping plate 26 and wiping head 3, on the parts supporting them (free end 28 of receiving device 1 and liquid dispenser 5, respectively), assume such a position that their faces point in opposite directions. Wiping plate 26 and wiping head 3 are inclined in the direction of free end 28 in a symmetrical position relative to each other in an imagined line extending in the lengthwise direction of receiving device 1.

A roll 27A forms the supply of absorptive cloth 27 which is located in an insertion compartment 30 of receiving device 1. Compartment 30 is disposed within the zone of the end 29, which is opposite free end 28. Insertion compartment 30 is joined with receiving cavity 22 behind separating wall 34 and has an opening 35 opposite cavity 22. In this way, strip-like absorptive cloth 27 can be guided from roll 27A across base wall 36 of receiving cavity 22 and into the zone of wiping plate 26.

Figure 5:
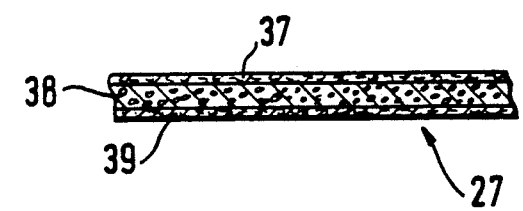

As can be seen in FIG. 5, absorptive cloth 27 preferably consists of several layers of paper (see FIG. 5), whereby a first layer 37 opposing the surface to be cleaned is an optical paper; a second layer 38 and a third layer 39, respectively, are layers with increased absorbency. Third layer 39 has a higher strength than second layer 38 so as to be capable of withstanding the mechanical stress of wiping plate 26 during the cleaning operation. This structure of absorptive cloth 27, furthermore, assures that the surface to be cleaned is subjected to a careful and lint-free treatment, on the one hand, and that good absorption is accomplished, on the other hand.

As can be seen in FIGS. 1, 4A and 4B, opening 35 of insertion compartment 30 is covered by a sliding cover 41 displaceably supported on lateral guide bridges 40 of the receiving device 1. This sliding cover 41, at its end pointing in the direction of wiping plate 26, has an extension 42, which, together with the base wall 36 of receiving cavity 22, forms a guide gap 43 for absorptive cloth 27.

An outwardly convex, elastic zone 44 is molded in extension 42 of sliding cover 41 and, on its outer side, is provided with gripping ribs 48. On the inner side 45, elastic zone 44 has transporting teeth 46 for advancing absorptive cloth 27. In guide gap 43, transporting teeth 46 are opposed by retaining teeth 47, which are molded on base wall 36. Elastic zone 44 extends in the lengthwise direction of sliding cover 41 and is cut free on the sides and, in the lengthwise direction, connected with the sliding cover via the compressible bending zones 49.

Sliding cover 41, on its extension 42 pointing in the direction of the free end 28 of the receiving device 1, has a face 50 shaped into a tearing edge 51 for absorptive cloth 27. Preferably, tearing edge 51 consists of a great number of sharp teeth 62 (cf. FIG. 3).

In the zone between tearing edge 51 of sliding cover 41 and wiping plate 26, provision is made for a raised guide slope 52 on base wall 36 of receiving cavity 22. Guide slope 52 assures that absorptive cloth 27 is safely guided across wiping plate 26 as it is being advanced.

Guide slope 52 has a crest 63, which serves as a support for a removable hood 55. Hood 55 covers both wiping head 3, wiping plate 26, and receiving cavity 22 with liquid dispenser 5. FIG. IA shows that on its lateral surfaces 64, hood 55 has guide deepenings 65 disposed on the inside, which engage cams 66. Cams 66 are molded on the outer surfaces of free legs 23 of the receiving space 22.

Wiping head 3 and wiping plate 26 both may have a round shape (cf. FIG. 6). For special applications, e.g., for modern glasses adapted to the fashion trend, which have lenses that are partly shaped in a relatively pointed fashion, the wiping head 3 and the wiping plate 26 may have a shape according to FIG. 7, which is round in a part zone 53, and then forming a rounded tip 54A via the curves 54 extending along a convex line.

The device forms, as a whole, a handle for cleaning particularly optical lenses or glasses. After removing hood 55, the device is placed onto the glass with wiping head 3 pointing downward with an inclination, whereby such wiping head adapts itself to the position of the glass surface by its elastic fastening pin 10. Wiping cloth 13, which is directly connected with the liquid supply of liquid dispenser 5, immediately dispenses liquid onto the surface. The dispensing of liquid may be increased by laterally pressing elastic legs 23 by hand, which presses liquid dispenser 5. Even greasy dirt is completely dissolved in the cleaning liquid by mild rubbing of the surface, so that such dirt, upon lifting the wiping head off, is floating in the thick film of liquid remaining on the surface of the glass.

Absorptive cloth 27 is advanced into its working position across wiping plate 26 by first pulling sliding cover 41 back by hand without fully depressing elastic zone 44 downwardly. Cover 41 will knock against the right inner edge 68 of the insertion compartment 30 with a locking cam 67. Thereafter, with elastic zone 44 fully depressed, sliding cover 41 is pushed forward again. This pushes absorptive cloth 27 across guide slope 52 and into it working position. If need be, this can be accomplished by repeating the transporting action to sufficiently advance cloth 27. Subsequently, the entire handle is turned in such a way that absorptive cloth 27 rests on the surface of the glass and is enclosed between the glass and wiping plate 26. By subsequent wiping motions, the entire surface area of the glass is wiped off, so that the liquid film is completely lifted from the surface. As with the prior application of cleaning liquid by wiping head 3, the outermost corners of the frame of the glasses are wiped, because the heads are shaped accordingly. The outer edges of the wiping or absorptive cloth are available. After the cleaning operation, the used part of absorptive cloth 27 can be torn off along tearing edge 51.

For replenishing liquid dispenser 5, it can be pulled from receiving cavity 22 via gripping ribs 69 and, after opening refilling closure 6, filled up again from a refilling supply consisting of a compressible bottle (not shown here) with a tubular dispenser.

For replacing absorptive cloth supply (roll 27A), sliding cover 41 is completely pulled off the receiving device to the right against the locking force of cam 67 and edge 68 (embodiment based on FIG. 1). Insertion compartment 30 is exposed for inserting a new roll 27A. After manually placing the free starting end of the new absorptive cloth 27 on retaining teeth 47 of base wall 36, sliding cover 41 is pushed again over the device, and the entire device is ready again for use. FIG. 1 shows that sliding cover 41 with its tearing edge 51 can be pushed to the left beyond the position shown (transport position covered by hood 55). Sliding cover 41 may slide up to the raised guide slope 52, which may facilitate tearing of the absorptive cloth 27, but which also saves absorbent cloth.

The apparatus shown in the figures and explained in the description represents one embodiment of the invention, but other designs are readily possible as well and covered by the general idea of the invention. Such other embodiments may, for example, contain a clamping device for the free end of absorptive cloth 27 guided across wiping plate 26; however, tests have shown that the apparatus is entirely efficient even without such locking means.

What is claimed is:

1. An apparatus for cleaning the surfaces of optical glasses comprising:
    a longitudinally extending handle having a first and second end;
    wetting and wiping means for the surfaces of the optical glasses for loosening and detaching the impurities; and
    cleaning means for absorbing the impurities from the surfaces of the optical glasses, wherein said wetting and wiping means and said cleaning means are both located at said first end of said handle on opposite sides of a longitudinal axis of said handle, generally facing away from the longitudinal axis.

2. The Apparatus as defined in claim 1, wherein said wetting and wiping means include a liquid dispenser and a liquid dispensing wiping head, coupled to said liquid dispenser.

3. The Apparatus as defined in claim 2, wherein said liquid dispenser is a compressible bottle, having two ends with a removable cap on one end, which can be removed to refill said liquid dispenser, and has an opening on the other end for receiving said liquid dispensing wiping head.

4. The Apparatus as defined in claim 2, wherein said liquid dispenser is tapered toward the end having an opening and said liquid dispensing wiping head extends laterally outward from said tapered end.

5. The Apparatus as defined in claim 2, wherein said wiping head includes a substantially plate-shaped supporting element with two sides and an edge having a hollow fastening tube with a liquid duct extending from said first side of said supporting element and radially extending distribution grooves on said second side of said supporting element, and a wiping cloth covering said distribution grooves and said edge of said supporting element, liquid passing from said liquid dispenser through said liquid duct and wetting said wiping cloth.

6. The Apparatus as defined in claim 5, wherein said wiping cloth is made from a soft brush-like material.

7. The Apparatus as defined in claim 5, wherein said wiping cloth is a velvet material.

8. The Apparatus as defined in claim 5, additionally including a holding device, wherein said wiping cloth is placed around said wiping head and is attached to said first side of said wiping head by said holding device.

9. The Apparatus as defined in claim 8, wherein said holding device is a plate adapted to the shape of said supporting element, said plate having an upwardly conically expanded hole for receiving said fastening tube, said fastening tube including a locking groove, said holding device having an outer edge and an inner locking edge for engaging said locking groove and having barbs on its outer edge which point in the axial direction of said fastening tube, toward said second side of said supporting element, said outer edge being pre-tensioned against the back side of said supporting element with said barbs engaging said wiping cloth.

10. The Apparatus as defined in claim 9, wherein said supporting element is made of a plastic material, which is softer than the material of said holding device.

11. The Apparatus as defined in claim 9, wherein said fastening tube is conically shaped at its end and is pressed into a correspondingly conically shaped opening on said liquid dispenser.

12. The Apparatus as defined in claim 5, additionally including an elastic plate made of spongy material, located between said distribution grooves and said wiping cloth.

13. The Apparatus as defined in claim 2, wherein said handle includes a first compartment for receiving said liquid dispenser, said first compartment being open on one side and having flexible legs on either side of the opening and locking means, said liquid dispenser having counter-locking means to engage said locking means.

14. The Apparatus as defined in claim 13, wherein said handle includes a second compartment and said cleaning means includes a wiping plate and a supply of absorptive cloth which is located within said second compartment and is dispensable from said second compartment to a location between said wiping plate and the surface to be cleaned, said wiping plate being fastened to said first end of said handle.

15. The Apparatus as defined in claim 14, wherein said wiping plate is made from an elastic plastic material and has a substantially concave surface provided with a plurality of small anchoring elevations.

16. The Apparatus as defined in claim 15, wherein said wiping plate has an elastic pin and said handle includes a locking bore for engaging said elastic pin.

17. The Apparatus as defined in claim 16, wherein said wetting and wiping means and said cleaning means are arranged symmetrically on either side of a longitudinal axis of said handle portion.

18. The Apparatus as defined in claim 17, wherein said handle includes a separating wall and a base wall, wherein said base wall separates said first compartment from said second compartment and wherein said second compartment includes an opening adjacent to the external side of said base wall along which said absorptive cloth is guided toward said wiping plate.

19. The Apparatus as defined in claim 18, wherein said absorptive cloth is a roll of absorptive cloth.

20. The Apparatus as defined in claim 19, wherein said absorptive cloth includes several layers.

21. Apparatus as defined in claim 20, wherein said absorptive cloth includes three layers, a first layer made of optical paper for contacting the surfaces to be cleaned, a second and third layers having greater absorption properties than said first layer, said third layer being stronger than said second layer.

22. The Apparatus as defined in claim 21, wherein said handle includes a sliding cover and guide bridges, wherein said sliding cover slides on said guides bridges to cover said second compartment, said sliding cover having an extension, which points in the direction of said wiping plate and together with the external side of said base wall forms a guide gap through which said absorptive cloth is guided.

23. The Apparatus as defined in claim 22, wherein said extension includes a flexible zone having transporting teeth facing said base wall and gripping ribs facing away from said base wall, said base wall having retaining teeth.

24. The Apparatus as defined in claim 23, wherein said flexible zone extends in the lengthwise direction of said sliding cover and wherein said flexible zone is attached to said sliding cover at its ends via compressible bending zones.

25. The Apparatus as defined in claim 24, wherein said sliding cover includes teeth forming a tearing edge which point in the direction of said wiping plate.

26. The Apparatus as defined in claim 25, wherein a portion of said base wall located near said wiping plate has a raised guide slope.

27. The Apparatus as defined in claim 26, wherein said wiping head and said wiping plate have a round shape.

28. The Apparatus as defined in claim 26, wherein said wiping head and said wiping plate have a teardrop-shape with one end thereof having a point formed by convex curves.

29. The Apparatus as defined in claim 28, further including a hood for covering said wiping head, said wiping plate and said first compartment.

30. The Apparatus as defined in claim 29, wherein said absorptive cloth is wider than the diameter of said wiping plate.

31. An Apparatus for cleaning the surfaces of optical glasses comprising:
a longitudinally extending handle having a first and a second end with a compartment at said second end;
wetting and wiping means for loosening and detaching the impurities on the optical glass surface; and
cleaning means including a plate and a supply of absorptive cloth, wherein said wetting and wiping means and said plate are both located at said first end of said handle, said supply of absorptive cloth disposed within said compartment and being dispensable from said compartment to a location between said plate and the optical glass surface for absorbing the impurities from the surface when pressed onto the surface by said plate.

* * * * *